Figure 9:
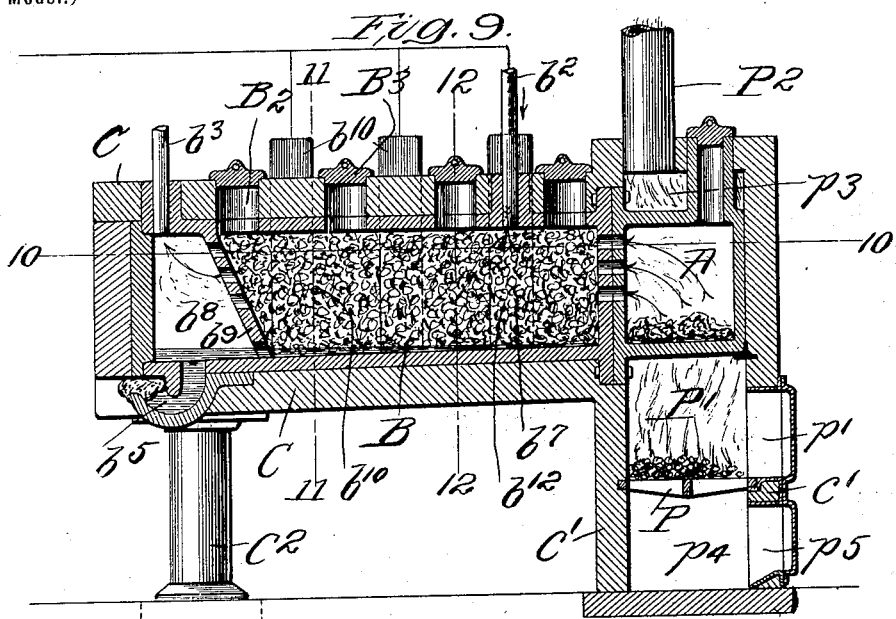

No. 626,635. Patented June 6, 1899.
G. SCHWAHN.
PROCESS OF REDUCING ALUMINIUM FROM ITS COMPOUNDS.
(Application filed Sept. 7, 1897.)
(No Model.) 4 Sheets—Sheet 1.
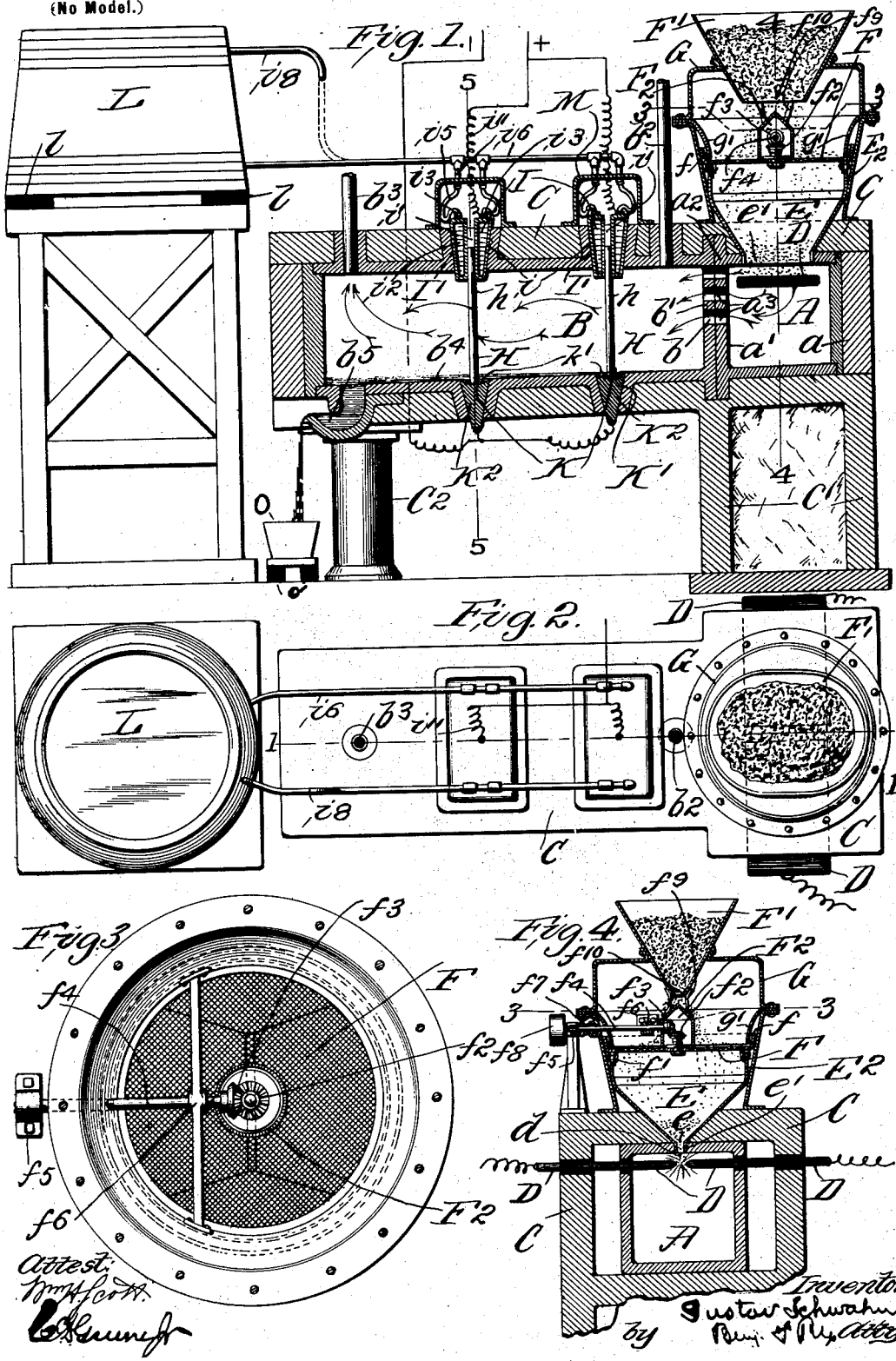

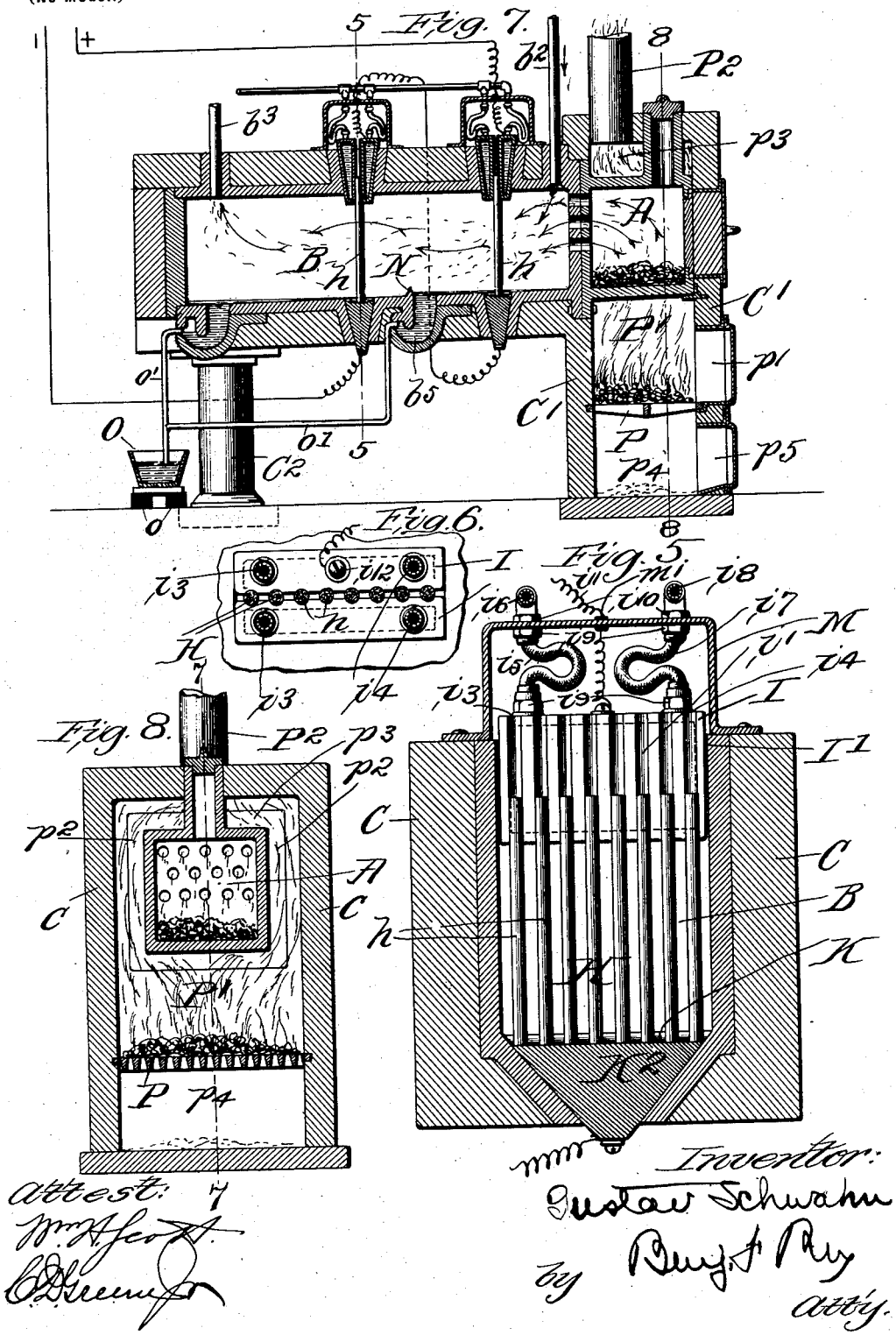

No. 626,635. Patented June 6, 1899.
G. SCHWAHN.
PROCESS OF REDUCING ALUMINIUM FROM ITS COMPOUNDS.
(Application filed Sept. 7, 1897.)
(No Model.) 4 Sheets—Sheet 3.

Inventor:
Gustav Schwahn

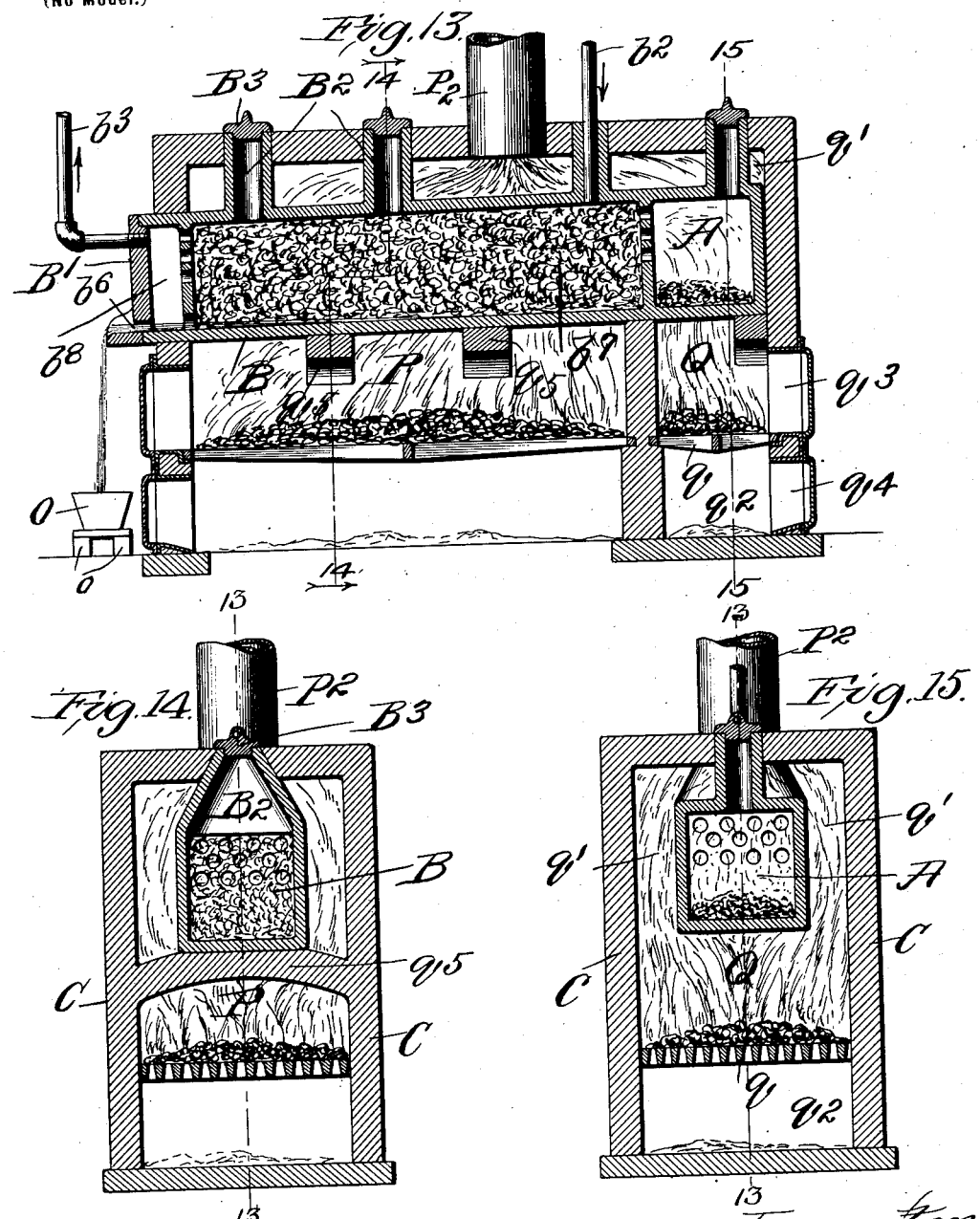

UNITED STATES PATENT OFFICE.

GUSTAV SCHWAHN, OF ST. LOUIS, MISSOURI.

PROCESS OF REDUCING ALUMINIUM FROM ITS COMPOUNDS.

SPECIFICATION forming part of Letters Patent No. 626,635, dated June 6, 1899.

Application filed September 7, 1897. Serial No. 650,703. (No specimens.)

*To all whom it may concern:*

Be it known that I, GUSTAV SCHWAHN, a citizen of the United States, residing at St. Louis, in the State of Missouri, have invented a new and useful Process of Reducing Aluminium from its Compounds, of which the following is a specification.

The production of aluminium by the processes now in public use is expensive, and the production of aluminium free from any alkali-metal alloy is especially so.

The chief objects of my improvements are, first, to simplify and cheapen the production of aluminium in general, and, second, to provide a process which will enable aluminium, free from any alkali-metal alloy, to be produced readily and cheaply. I attain these objects by means of the process hereinafter described.

The preferred mode of practicing my process is as follows: I begin by selecting an aluminous compound in which the aluminium is in a volatilizable state, and preferably one which is substantially free from any other volatilizable metal adapted, if reduced, to alloy aluminium, and preferably also free from silica, and it is desirable, though not essential, that the compound selected should be in an anhydrous condition.

It is not essential that the entire compound should be volatilizable, though all the elements of the compounds which I prefer to use are incidentally volatilized in volatilizing the aluminium combined therewith. The compounds which I prefer to use are pure anhydrous alumina, fluorid of aluminium, and chlorid of aluminium; but though I consider said compounds the best I do not confine myself to them. Of the compounds named I prefer alumina.

Having selected the compound to be treated, I volatilize the aluminium forming an element thereof, and in doing so incidentally volatilize some or all of the other elements of the compound. The composition of the resulting vapor may or may not be the same as that of the original compound. However that may be, I subject the resulting vapor to the action of incandescent carbon or its equivalent, preferably at a white heat and preferably, but not necessarily, substantially free from iron, alkali, silica, or any other element liable to alloy the reduced aluminium, in a chamber from which the outer air is substantially excluded. I preferably also at the same time subject the vapor of the compound treated to the action of an electric current passing through the incandescent carbon, and while subjecting the vapor to the action of the incandescent carbon I also subject it to the action of a suitable hot carbon-gas deoxidizer—such, for instance, as carbon monoxid. The carbon gas used usually results in whole or in part from rendering the carbon used in the reduction incandescent and maintaining it in that state; but though in such cases I incidentally produce a certain amount of carbon monoxid by heating the carbon in the reduction-chamber to incandescence I preferably do not rely entirely upon the gas produced in that way, but preferably in all cases introduce a supply of carbon-gas deoxidizer into the reduction-chamber during the process of reduction, and preferably introduce it in a heated state. The result of subjecting the metalliferous vapor to the action of the incandescent carbon and a hot carbon-gas deoxidizer for a suitable length of time is the liberation of the aluminium from the oxygen combined therewith and its reduction to a metallic state. The aluminium in the vapor is not reduced instantaneously as soon as the aluminous vapor enters the reduction-chamber. If not previously mixed with the carbon-gas deoxidizer used, it should be given time to mix therewith, and if the aluminous vapor and the deoxidizer have not been previously heated they should be given time to heat or to acquire the additional heat required. They should be allowed to acquire a heat approximately that of incandescent carbon. Again the chemical reaction requires an appreciable time. The vapor from which aluminium is to be reduced should therefore be detained in the reduction-chamber in all cases long enough to mix with the gaseous deoxidizer, if not previously mixed, and acquire the necesary heat, if not previously heated, and should in all cases be retained long enough to secure the desired reaction, and preferably not less than fifteen seconds.

The carbon-gas deoxidizer which I prefer to use in my process is carbon monoxid; but other gases and vapors, or mixtures of gases or vapors or gases and vapors in which carbon is present in such a state, condition, mixture, or compound that it will be able to act as a deoxidizer of aluminous vapor when such gas, vapor, or mixture is substituted for carbon monoxid in my process may be used, and all such gases, vapors, and mixtures are intended by me to be included within the meaning of the phrase "a carbon-gas deoxidizer." Whether or not carbon can be vaporized is not well settled. If it can be, its vapor is a "carbon-gas deoxidizer" within the meaning of my claims.

Where the incandescence of the carbon is produced by the passage of a current or currents of electricity through the carbon, the reduction of the aluminium is hastened.

The influence of the electric current upon the reduction appears to extend out from and around the carbon and to become weaker as the distance from the carbon increases. Whether the action within the neighborhood of incandescent carbon through which a current of electricity is passing is electric or magnetic I am unable to state, but the reduction seems to become more active as the conductors are approached.

Where the reducing-chamber is formed as shown in my drawings and the metalliferous vapor is repeatedly brought in contact with incandescent carbon on its way to the outlet for waste vapor from said chamber, the heat of the vapor and the chamber itself becomes greater and greater from the inner to the outer end of said chamber and near the outer end is very intense, and where the heat of the vapor to be reduced is increased progressively and rendered very intense as the vapor passes through the reduction-chamber the reduction is more complete and the reduced metal is almost if not entirely free from carbon. The longer the chamber the hotter the carbon and the gases in the chamber, and the more frequently the vapor is brought into contact with incandescent carbon during its passage through the reduction-chamber the purer the reduced metal will be, other things being equal. In conjunction with the carbon-gas deoxidizer hereinbefore mentioned I preferably use in my process a flux and dehydrating agent, and prefer to use it in a gaseous or vaporized state. The flux and dehydrating agent which I prefer to use is fluorin gas, of which a mere trace will answer, and a quantity equal to one-half of one per cent. of the total gaseous charge of the reduction-chamber is ample. Where the amount used is more than one-half per cent. of the total charge, the surplus is useless, but does not prevent the desired reduction. Among fluxes and dehydrating agents available in carrying out my process I rank chlorin gas next to fluorin gas. It is not essential whether the gas used as a flux and dehydrating agent is generated outside of the reduction-chamber or within it. The carbon gas and the gas used as a flux and dehydrating agent may be introduced into the reduction-chamber either separately or together and either before or after the introduction of the aluminous vapor or along with such vapor; but ordinarily my process is carried on in a continuous manner and the aluminous vapor, the carbon gas, and the flux and dehydrating agent are preferably supplied in a substantially continuous manner.

Where in my claims I speak of using a "gaseous flux," I desire to be understood as including those cases in which the aluminous compound subjected to process itself contains as an element a volatilizable material adapted to act as a flux, and where for that reason no additional flux and dehydrating agent is added—as, for instance, where the compound treated is the fluorid or chlorid of aluminium.

Where aluminium is to be reduced from the vapor of pure alumina without the assistance of fluorin or chlorin or their equivalents, the aluminous vapor has to be subjected to a very intense heat. I have secured no good results in such cases without heating it to a temperature at least as high as the white heat of carbon, and the best results have been secured where the temperature of the vapor while in the reduction-chamber has in consequence of chemical reactions within said chamber risen even higher than the usual white heat of carbon.

As is well known, chlorid of aluminium and perhaps other aluminous compounds may be vaporized by means of ordinary furnace-heat applied to a containing apparatus; but in treating others, such as the oxids of aluminium and fluorid of aluminium, a higher heat is necessary to enable the best result to be secured, and such substances are preferably vaporized by subjecting them to the heat and electric action of a voltaic arc preferably created by causing a suitable current of electricity to spring from one carbon electrode to another. The carbon electrodes should preferably be free from silica, alkali, and iron where the reduced metal is desired to be free from those substances.

As I have stated, the use of an arc may be dispensed with and very good results secured where the compound treated is one as easily volatilized as chlorid of aluminium; but the vaporization is more rapid even in that case where a voltaic arc is used, and for that reason and because the aluminium in vapor produced in that way is more easily reduced I prefer to use an arc in all cases. I also prefer to use a voltaic arc because where it is formed between carbon electrodes it supplies a certain amount of carbon monoxid and because such an arc offers a convenient means for generating a still larger supply of gas. Where I use the preferred form of my apparatus hereinafter described, I preferably, but not necessarily, pulverize the metalliferous compound to be volatilized and preferably mix with it pulverized carbon, and when the compound does not contain a flux and dehydrating agent I also preferably mix fluorid of aluminium with it. I then preferably cause the mixture to pass through an arc and its elements to be volatilized together. The small quantity of air which enters the apparatus is neutralized with the formation of carbon monoxid. No particular proportion of carbon or fluorid is essential; but I preferably mix about one per cent. of carbon and one per cent. of fluorid with ninety-eight per cent. of the aluminous compound.

No particular arrangement of the pieces of carbon placed in the reduction-chamber is necessary, though the arrangement should preferably be such as to cause all the vapor intended to be decomposed to either come into actual contact with one or more pieces of the carbon or approach them closely and to increase the heat of the vapor as it is caused to move by the pressure resultant from the expansion of the volatilized substances to move through the chamber toward the outlet.

The incandescence of the carbon preferably used in my process of reduction may be produced, among other ways, either by the passage of a suitable electric current through the carbon or by the application of external heat, or by both. No reduction will take place within a voltaic arc, however, in my opinion.

The result of my process is the reduction of the aluminium contained in the vapor subjected to the action of the incandescent carbon and hot carbon monoxid or its equivalent and the deposit of the reduced aluminium in the reduction-chamber. Where a suitable flux is used, the aluminium is deposited in a fused state and runs together.

Where the vapor treated neither contains nor carries any silica or any metal besides aluminium, the reduced metal will be free from silica and metallic alloy unless allowed to absorb them in the reduction-chamber, and the more frequently the aluminous vapor is brought into contact with incandescent carbon and the greater the heat to which it is subjected in the reduction-chamber the freer the reduced metal will be from carbon, other things being equal. The reduced metal may either be tapped out of the reduction-chamber from time to time or allowed to run out into a suitable receptacle as fast as it is reduced. The non-metallic elements of the vapor from which the aluminium is separated form after such separation one or more new combinations and are led away in the form of gas or vapor through a suitable outlet.

An apparatus which I have designed for use in carrying out my process is illustrated in the accompanying drawings, in which—

Figure 10:
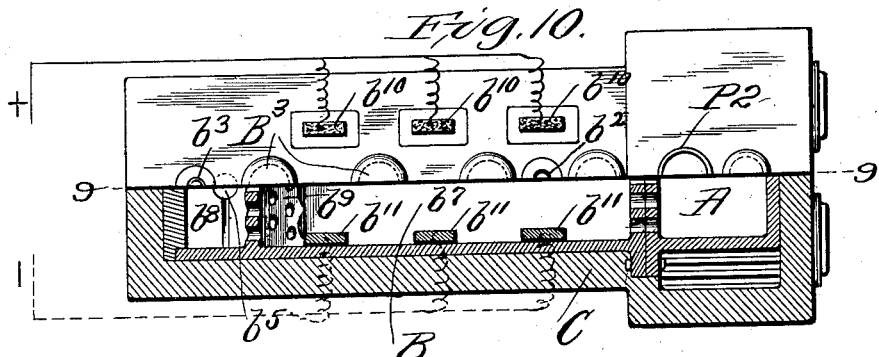
Figure 11:
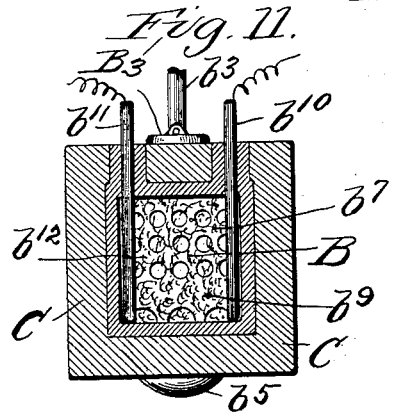
Figure 12:
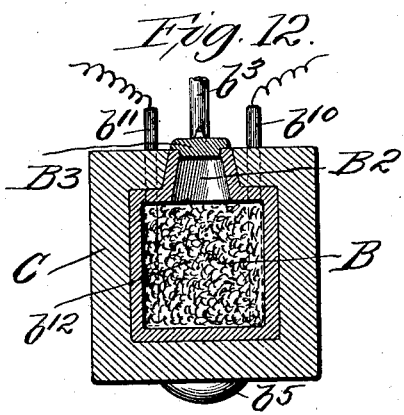

Figure 1 is in part a vertical section on line 1 1, Fig. 2, and in part a side elevation of the preferred form of my apparatus. Fig. 2 is a plan view of the apparatus shown in Fig. 1. Fig. 3 is a horizontal section on line 3 3, Figs. 1 and 4. Fig. 4 is a vertical section of a detail on line 4 4, Fig. 1. Fig. 5 is a detailed view, on an enlarged scale, of a transverse vertical section on line 5 5, Figs. 1 and 7. Fig. 6 is a detailed sectional plan view of portions of the device illustrated in Fig. 5. Fig. 7 is a central vertical longitudinal section of a modified form of my apparatus on line 7 7, Fig. 8. Fig. 8 is a transverse section on line 8 8, Fig. 7. Fig. 9 is a vertical longitudinal section of another modification on line 9 9, Fig. 10. Fig. 10 is a view of the same apparatus, partly in plan and partly in section, on line 10 10, Fig. 9. Fig. 11 is a transverse vertical section on line 11 11, Fig. 9. Fig. 12 is a similar section on line 12 12, Fig. 9. Fig. 13 is a vertical longitudinal section on line 13 13, Figs. 14 and 15, of another modification. Fig. 14 is a transverse vertical section on line 14 14, Fig. 13. Fig. 15 is a similar section on line 15 15, Fig. 13.

Similar letters refer to similar parts throughout the several views.

A, Figs. 1, 7, 8, 9, 10, 13, and 15, represents the volatilization-chamber of my apparatus. Its inner walls may be formed of bricks or tiles of fire-clay or other suitable material. Its front end $a$ is preferably removable and affords access to its interior. Its rear end preferably has a lower unperforated section $a'$ and an upper section $a^2$, containing a series of perforations $a^3$, and preferably rests against the front end wall of a reduction-chamber B, Figs. 1, 7, 9, 10, 11, 12, 13, and 14, which preferably contains perforations $b$, which register with the perforations $a^3$. The object in having an unperforated section $a'$ is to prevent fused material from flowing into the chamber B without being vaporized, and the object of having a series of perforations $a^3$ instead of having a single large opening is to spread the vapor passing through them and cause it to enter the chamber B in a series of small streams or jets rather than in a single stream passing close to the top of the apparatus. It will be understood, however, that this special form of partition is not essential, nor is any partition absolutely essential in all cases, for if the division-walls between the chambers A and B were entirely removed the apparatus could still be used with some success, and in that case heat radiating from the chamber B would be advantageous in vaporizing the material treated.

The reduction-chamber B is preferably an oblong chamber, preferably having walls of a material which is a non-conductor of electricity—such as magnetite, calcium aluminate, or fire-clay, the two first named answering my purpose best. It is preferably provided with an inlet-pipe $b^2$ for the admission of fluxes and dehydrating agents or carbon monoxid or other carbon gases, and a pipe $b^3$ for the escape of waste gases and vapor. Its bottom $b^4$ preferably slopes down toward the rear, and at its rear end it is preferably supplied with a passage for the escape of reduced metal. This passage is preferably in the form of a trap $b^5$, as shown in Figs. 1, 7, and 9, but may be a simple straight passage $b^6$, as represented in Fig. 13. The advantage of the trap is that its form prevents the inward passage of air through it after it is filled with molten metal, while offering a free passage for metal from the inside to the outside of the reduction-chamber. Either form of outlet may be tamped with clay or its equivalent, as shown in Fig. 9. In the preferred form of my apparatus the chambers A and B are preferably inclosed in suitable outer walls C, designed to prevent the escape of heat and resting upon suitable supports. In this form of my apparatus the supports shown consist of a column $C^2$ at the rear end and walls C' at the front end; but no special means for supporting the furnace are essential, as will be obvious. In said preferred form of my apparatus I vaporize the material treated by means of a voltaic arc and preferably use for that purpose a pair of electrodes D, through which I pass a suitable current of electricity. I preferably use carbon electrodes free from iron, alkali, and silica and preferably in the shape of flat rectangular blocks or slabs, substantially as shown.

Above the electrodes D, I preferably arrange a hopper E, having a spout with an oblong opening $e'$, preferably directly above the opening $d$ between the electrodes D and adapted to drop material between them.

Above the upper end of the hopper E, I preferably arrange a circular sieve F, preferably having an upwardly-projecting flange $b$ and preferably supported upon small flanged wheels $f'$, which preferably run on a circular upper edge $E^2$ of the hopper E. The sieve thus supported is free to revolve and is caused to rotate by means of a pinion $f^2$, attached thereto, a pinion $f^3$ meshing in with the pinion $f^2$ and attached to a shaft $f^4$, preferably supported in bearings $f^5$ and $f^6$ and a stuffing-box $f^7$ and receiving motion from a pulley $f^8$, Figs. 1, 2, 3, and 4. Above the sieve F a hopper F', preferably of an inverted frustumal shape, is supported in position to feed the sieve with the material to be treated. Its lower end is preferably incased in and supported by a housing G, which preferably extends below the top of the hopper E and is closed at its lower end, so as to prevent the escape of vapor. From the inner side of this housing an annular flange $g'$ preferably extends inward and downward above the sieve F, and its lower end preferably extends down within the annular flange $f$ of the sieve, so as to prevent the escape of unsifted material over the top of said flange.

In order to prevent the cogs of the pinions $f^2$ and $f^3$ from becoming clogged, I preferably shield them by means of a housing $F^2$, which may be suspended from the hopper F' by hangers $f^9$ or supported in position in any other convenient manner.

The material to be treated is preferably introduced into the hopper F' in a powdered form and by its presence prevents gas from passing up through said hopper and escaping to any material extent. The width of the opening $f^{10}$ at the lower end of said hopper should preferably be narrow, so as to prevent the too-rapid escape of the material placed therein. If desired, any known means (not shown in the drawings) for feeding the material placed in this hopper to the sieve or arc beneath in a regular manner may be used.

Instead of the preferred apparatus described a Siemens electric furnace having vertical electrodes or any other suitable furnace may be used.

In my reduction-chamber B, I preferably use carbon in the shape of cylindrical rods $h$, Figs. 1, 5, 6, and 7, preferably arranged upright in one or more series H, each series preferably extending across said chamber in the form of a grating, substantially as shown in Fig. 5. I preferably arrange the carbon rods of each series about one-sixteenth of an inch apart, so as to leave openings for the passage of vapor, and have found the arrangement works well; but no particular spacing is essential.

I prefer to use two or more series H of carbon rods, but, as will be obvious, the number is not an essential feature of my invention in its broadest sense, as a single series will perform the work of reduction to some extent; but better work is done where two or more series are used, as they assist in causing the heat in the reduction-chamber to become greater as the inner end of such chamber is approached, and I have found in practice that this causes the reduction to be more complete and the product freer from carbon than it is where only a single series is used. The carbon rods $h$ of each series are preferably held at the top between a pair of holders I and at the bottom rest within a concavity K, formed in the top of a holder $K^2$.

The holders I preferably rest in opening I', preferably about as long as the chamber B is wide and preferably having outwardly-flaring sides $i$. One or both, and preferably both, of the holders I are substantially wedge-shaped—that is, thinner at their respective lower ends than at their upper ends—and the inner face of each preferably contains a series upwardly-extending grooves $i'$, each adapted to receive and fit the side of a carbon rod, and each pair is preferably arranged and spaced alike, so that those in one holder of a pair will come opposite those in the other holder, as shown most clearly in Fig. 6. The holders I are preferably formed of or plated with aluminium, so as to prevent their contaminating the reduced metal with any alloy, and each preferably contains a water-chamber $i^2$, Figs. 1 and 7. Each of the chambers $i^2$ is connected with a source of water-supply and each preferably has an inlet $i^3$ and an outlet $i^4$. The inlets $i^3$ are preferably connected by means of flexible tubes $i^5$ with a pipe $i^6$, leading to the source of supply, which is preferably a water-tank L, Figs. 1 and 2, formed of insulating material or insulated by blocks L of insulating material or otherwise formed or arranged so as to insulate the water therein. The outlets $i^4$ for heated water are preferably connected by means of flexible tubes $i^7$ with a pipe $i^8$, leading to the tank L. In this way water may be caused to circulate freely through the holders I and their temperature kept so low as to prevent their being rapidly destroyed by the heat of the reduction-chamber and the carbons held thereby.

The flexible tubes $i^5$ and $i^7$ are preferably covered with material adapted to prevent their being injured by the heat to which they are subjected, such as asbestos, and are preferably connected with the holders I by suitable couplings $i^9$ and with the pipes $i^6$ and $i^8$, with which they respectively connect by means of couplings $i^{10}$, Fig. 5.

As spaces are left between the carbon rods, through which gas would otherwise be able to escape and air enter, I preferably place covers M, Figs. 1, 2, 5, and 7, over the openings I', containing the holders, and lead the water to and from said holders through said covers. I preferably use an alternating current of electricity for rendering the carbon rods incandescent, because it is cheaper than a direct current. The current may be led in through the holders I, preferably through a flexible conductor $i^{11}$, passing through the cover M of the series, from which it is preferably guarded by insulation $m'$. The conductor may be connected with one of the holders by means of a contact-post $i^{12}$ or any other suitable means. The holders should preferably be allowed to descend freely in their respective sockets, so as to enable their weight to force them into close contact with the series of carbon rods held thereby. Instead of the form of metal holders I described other similar forms may be substituted, and the preferred substances are not the only ones which may be used. Graphite answers the purpose equally as well so far as the product is concerned, and where it is used the holders may be made solid; but graphite holders do not make as good a contact with the carbon rods $h$ as metal holders do.

The holders $K^2$ are each preferably pyramidal in shape and are arranged with their respective large ends uppermost in socket $K'$, adapted to receive and fit them, as shown in Figs. 1, 5, and 7. They are preferably formed of carbon. The contact between the carbon rods $h$ and the holders $K^2$, upon which their lower ends rest, is imperfect, and hence I preferably fill the cavities in the holders $K^2$, in which the ends of the rods $h$ rest, with molten aluminium $K'$ after the rods $h$ are in place. This makes a good electrical connection and prevents the formation of arcs. The metal used for this purpose is preferably introduced into the cavities K before the apparatus is started; but if it is not they are filled automatically by the operation of the machine, for a large proportion of the reduced metal is deposited upon the carbon rods $h$ and, running down, soon fills the cavities K.

The different series H of carbon rods are preferably arranged in multiple arc, as shown in Fig. 1. Where two or more series H are arranged in series, means should be adopted to prevent short-circuiting through the reduced metal. In Fig. 7 I have illustrated the means which I prefer to use for that purpose and which consists of a low partition or dam N, interposed between the two series H of the rods shown, and a trapped outlet $b^5$, between said partition and the series H of rods in front of it, as well as a similar outlet at the rear end, as shown in Fig. 7. In all the forms of my apparatus illustrated I have shown the reduction-chamber discharging reduced metal into one or more receptacles O, preferably insulated by insulating-blocks $o$ or in any other convenient manner. The forms of my apparatus illustrated in Figs. 7 to 15 are designed for use where the compound to be treated is volatilizable by means of the heat of a furnace, and a grate P of common form is shown arranged below the volatilization-chamber A and having between it and the bottom of said chamber a combustion-chamber P', provided with a door $p'$ and connected with a smoke-stack P² by means of passages $p^2$ $p^2$, extending up on each side of the chamber O, and a transverse passage $p^3$ above said chamber. Below the grate P an ash-pit $p^4$ is shown provided with a door $p^5$ of common form. The ash-pit, combustion-chamber, and the passage leading to the smoke-stack are all preferably inclosed within the walls C and C', hereinbefore mentioned.

In the form of my apparatus illustrated in Figs. 9 to 15, inclusive, the reduction-chamber B is shown divided into a compartment $b^7$, in which the reduction is chiefly performed, and a rear end compartment $b^8$ by a perforated partition $b^9$, which is preferably made removable. The escape-pipe $b^3$ for gas and the outlet $b^5$ for metal both lead from the compartment $b^8$. The compartment $b^7$ of the chamber B is in this form of my apparatus substantially filled with carbon, consisting, preferably, of anodes $b^{10}$ and cathodes $b^{11}$, arranged in pairs opposite each other, and broken pieces of carbon $b^{12}$, preferably such known as "electric-light" carbon, substantially filling the intervening spaces and designed to be rendered incandescent by passing suitable currents of electricity from said anodes to said cathodes. The pieces of carbon $b^{12}$ are preferably arranged irregularly, so that openings are left, through which vapor is able to pass from one end of the compartment $b^7$ to the other. Said electrodes $b^{10}$ and $b^{11}$ are preferably arranged in multiple, substantially as shown. In the modification illustrated by Figs. 13 to 15, inclusive, the electrodes $b^{10}$ and $b^{11}$ are dispensed with, and the compartment $b^7$ is preferably filled with broken pieces of carbon, which are rendered incandescent by the combustion of fuel in a chamber beneath the chamber B upon a suitable grate $q$. The chamber Q and the combustion-chamber P below the volatilization-chamber A are both shown communicating with a common smoke-stack $P^2$, with which the chamber Q is connected by passages $q'$, passing up on each side of the chamber B. Beneath the grate $q$ there is an ash-pit $q^2$. The chamber Q is provided with a door $q^3$ of common form, and the ash-pit is shown provided with a similar door $q^4$. In this form of apparatus the chamber B is preferably supported upon arches $q^5$ and the products of the combustion of fuel in the chamber Q are allowed access to the bottom and sides of the inclosing wall of the chamber B.

In all of the different forms of apparatus shown the rear end B' of the chamber B is preferably made removable, so as to afford access to the interior of the chamber B, and in the forms of apparatus illustrated in Figs. 9 to 15, inclusive, the compartment $b^7$ of chamber B is provided with openings $B^2$ in the top thereof, through which carbon can be introduced and which are preferably closed by means of covers $B^3$.

The modes of operation of the different forms of apparatus described will be understood from the description of my process hereinbefore set forth. As will be obvious, each of the different forms of apparatus shown may be greatly changed in detail without departing from the underlying idea therein embodied, and many of the features shown are not essential, though all are considered useful.

So far as I am aware my process and apparatus are both broadly new, and I desire to cover them both broadly.

In my claims I use the word "gas" in its broadest sense and as including vapor.

Where I speak of vapor passing through the carbon, I mean through openings left in the carbon grate or pile for its passage.

Where I speak of the substantial exclusion of air from the volatilization-chamber, I do not mean such a complete exclusion as to prevent the operation of the apparatus.

Where I speak in my claims of the production of aluminium, I include the production of aluminium alloys as well as pure aluminium.

I claim—

1. As a process, subjecting a hot compound vapor containing aluminium to the action of a hot carbon-gas deoxidizer, in the presence of incandescent carbon, for an appreciable length of time, while substantially excluding the air.

2. As a process, subjecting a hot compound vapor containing aluminium to the action of a hot carbon-gas deoxidizer in the presence of incandescent carbon for not less than about fifteen seconds, while substantially excluding the air.

3. As a process, subjecting a compound vapor containing aluminium, while at a temperature not lower than that of incandescent carbon, to the action of a carbon-gas deoxidizer, which is at a temperature not below that of incandescent carbon, in the presence of incandescent carbon, for an appreciable length of time, while substantially excluding the air.

4. As a process, subjecting a compound vapor containing aluminium, while at a temperature not lower than that of carbon at a white heat, to the action of a carbon-gas deoxidizer at a temperature not below that of carbon at a white heat, in the presence of carbon at a white heat, for an appreciable length of time, while substantially excluding the air.

5. As a process, subjecting a compound vapor containing aluminium, while at a temperature not lower than that of incandescent carbon, to the action of a carbon-gas deoxidizer, which is at a temperature not below that of incandescent carbon, in the presence of incandescent carbon while simultaneously passing an electric current through the carbon, for an appreciable length of time, while substantially excluding the air.

6. As a process, subjecting a hot compound vapor containing aluminium, and containing as an element or admixture a substance adapted to act as a flux for aluminium, to the action of a hot carbon-gas deoxidizer in the presence of incandescent carbon, for an appreciable length of time, while substantially excluding the air.

7. As a process, subjecting a hot compound vapor containing aluminium, and containing fluorin as an element or admixture, to the action of a hot carbon-gas deoxidizer, and incandescent carbon, for an appreciable length of time, while substantially excluding the air.

8. As a process, subjecting an aluminous compound to the action of a voltaic arc and producing an aluminous vapor, and then subjecting the vapor to the action of a highly-heated carbon-gas deoxidizer, in the presence of incandescent carbon, for an appreciable length of time, while substantially excluding the air.

9. As a process, passing a compound vapor containing aluminium through a chamber from which air is substantially excluded, and which contains incandescent carbon at two or more points between its ends, causing said vapor to pass in the neighborhood of incandescent carbon repeatedly during its passage through said chamber; subjecting said vapor during its passage to the action of a hot carbon-gas deoxidizer for an appreciable length of time, and increasing the heat of said vapor during its progress through said chamber and while being acted upon by said gas, until its temperature is not lower than that of carbon at a white heat.

10. In the production of aluminium, subjecting an aluminous vapor substantially free from silica, any alkali, or any metal adapted to alloy aluminium, to the action of a carbon-gas deoxidizer and incandescent carbon substantially free from silica, alkali, or any metal adapted to alloy aluminium for an appreciable length of time, while substantially excluding the air.

GUSTAV SCHWAHN.

Witnesses:
BENJ. F. REX,
STORY SIDEBOTHAM.